Aug. 25, 1964 M. C. TATE 3,145,795
WEIGHING APPARATUS
Filed June 23, 1961 2 Sheets-Sheet 2
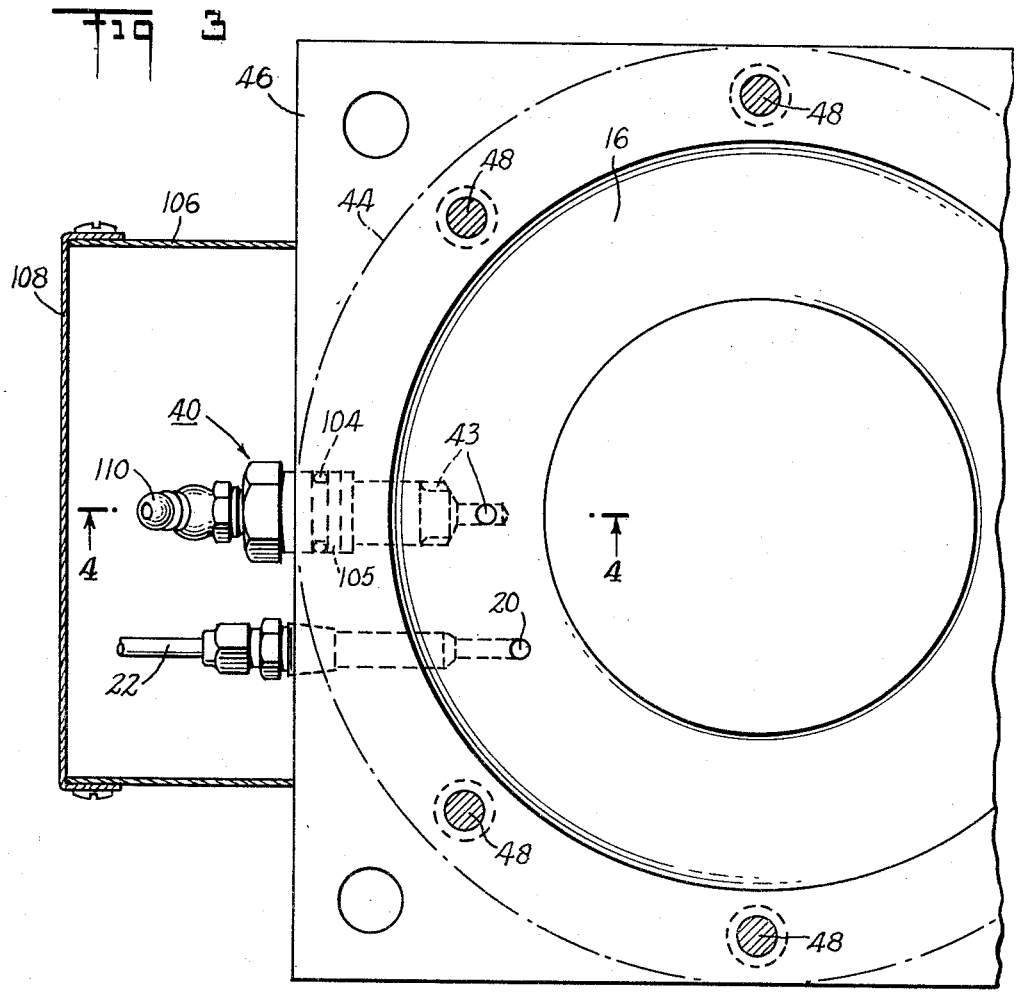
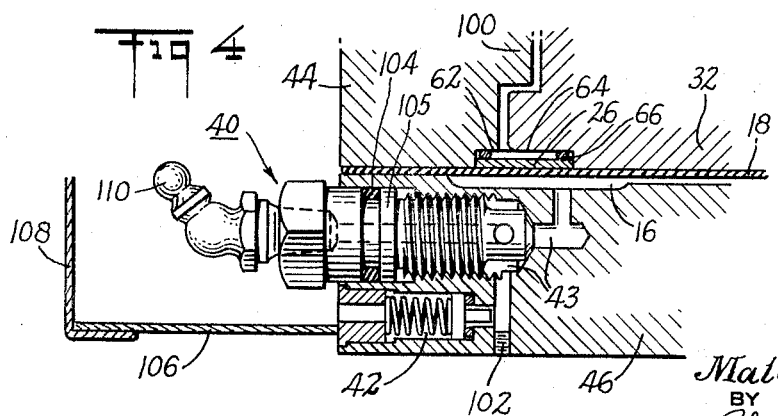
INVENTOR
Malcolm C. Tate
BY
Blair + Buckles
ATTORNEYS

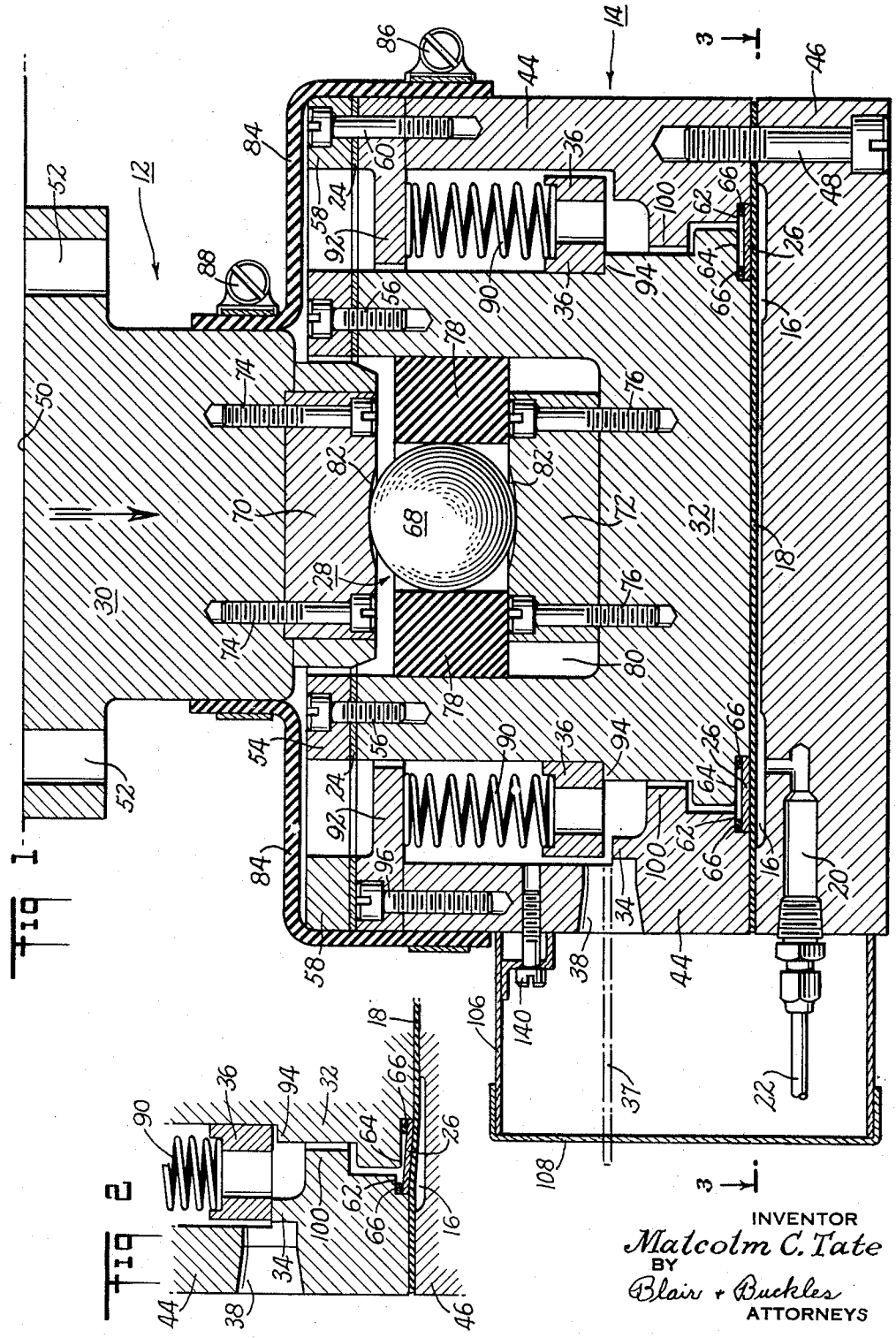

United States Patent Office 3,145,795
Patented Aug. 25, 1964

3,145,795
WEIGHING APPARATUS
Malcolm C. Tate, Stamford, Conn., assignor to The
A. H. Emery Company, New Canaan, Conn.
Filed June 23, 1961, Ser. No. 119,128
3 Claims. (Cl. 177—208)

This invention relates to an improved hydraulic weighing cell and more particularly, to a novel structure for a hydraulic weighing cell whereby cell filling is facilitated without damage to the apparatus or to the fill measurement gauge. The present invention is an improvement over the weighing apparatus disclosed in United States Patent No. 2,960,328, issued November 15, 1960, to M. C. Tate, and assigned to the assignee herein.

A hydraulic weighing cell such as illustrated in FIGURE 1 of the drawing generally consists of a piston 12 which is adapted to move downwardly in response to a load, into the interior of a closed cylinder, generally indicated at 14. Such movement acts upon fluid contained within a pressure chamber 16, sealed by a diaphragm 18. The chamber 16 communicates with a suitable pressure sensitive indicating device (not shown) such as a Bourdon tube mechanism, through pressure transmitting passageway 20 and indicator conduit 22. The indicating device may be calibrated to read directly in terms of pounds or grams of force or in any other desired unit.

In the preferred structure, the piston 12 is supported axially within the cylinder 14 by an annular stay plate 24 and a bridge ring 26. Both the plate and the ring are interposed between the piston and cylinder walls so that they will offset side thrusts on the piston without materially affecting its axial movement in response to a load force. The stay plate and the bridge ring merely deflect upon movement of the piston 12 and minimize inaccuracies stemming from off-center loading. They are essentially frictionless.

In addition to these side supports, a rolling ball coupling, generally indicated at 28, between the loading head 30 and the body portion 32 of the piston 12 further decreases the effect of off-center loading. It also eliminates any torque that may be exerted on the piston by weight loads which either do not lie flush on the loading head or which have a tendency to spin the loading head. Further, the coupling 28 overcomes transverse thrust resulting from expansion and contraction caused by temperature changes of weighted objects resting thereon.

The above described hydraulic weighing cell, or "load cell" as it is more commonly called, is generally used to weigh large and heavy loads. In the usual situation, the load is cradled or supported upon one or more support members which contain a load cell. By determining the relative distribution of load on the non-weighing supports and the load cell containing supports, and by properly calibrating an indicating means, the total weight of the load may be immediately ascertained from the reading on the indicator.

When a load cell is first installed, or when there is a calibration change by reason of a change in tare weight of the container, bin, etc., used therewith, it is frequently necessary to vary the hydraulic fluid content within the cell and the connecting hydraulic system. For example, immediately after installation, the conduit leading from the cell to the indicator must be filled with hydraulic fluid. Or if a new container is used, adjustment in the fluid content by reason of new piping, or lesser sensitivity may be necessary to properly calibrate the weighing system for direct reading of the load weight on the cell.

In the past, servicemen have accomplished this task by adding hydraulic fluid, or bleeding fluid from the system. The proper technique required periodic insertion of a feeler gauge through a gauging hole in the wall of the cylinder during filling or bleeding. The gauge measured an appropriate clearance between two elements of the load cell, generally betwen two shoulders on the piston and the cylinder wall respectively. The clearance was directly proportional to the hydraulic fluid content in the cell.

Unfortunately, in actual use, some servicemen, due to haste, unintelligent or just plain shoddy use of the feeler gauge and the load cell apparatus, retain the gauge in the clearance. This frequently results in damage to the gauge and, even worse, in damage to the load cell housing. The gauge becomes jammed within the diminishing clearance and it frequently shatters or scores. Simultaneously or alternatively, the housing of the load cell may score or the operating mechanism may be skewed out of alignment. Thereafter, the weighing cell is inaccurate. Obviously the use of an inaccurate weighing system and the expense of replacing the feeler gauge and rebuilding or repairing the load cell is not desirable to either the user or to the manufacturer.

A contributing factor in this problem is the difficulty in filling or altering the fill content of the cell. The lack of a simple and easy connection into the cell annoys the serviceman. Since he generally has to service a large number of cells, he eventually becomes careless and negligent and drifts into sloppy service technique.

An object of this invention is to provide a load cell apparatus having a novel structure wherein filling of the cell is facilitated.

Another object of the present invention is to provide a load cell apparatus of the above character wherein continuous gauging while filling the cell is possible.

A further object of the present invention is to provide a load cell apparatus of the above character wherein damage to the housing during gauging is completely avoided.

A still further object of the present invention is to provide a load cell apparatus of the above character wherein damage to the feeler gauge used for gauging cannot occur.

Another object of the present invention is to provide a load cell apparatus of the above character wherein accidental over-pressuring of the diaphragm when filling is not possible.

Another object of the invention is to provide a load cell apparatus of the above character having a structural outline which is more readily adaptable to incorporation into existing load supporting structures.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIGURE 1 is an enlarged cross-sectional view of the novel load cell of this invention;

FIGURE 2 is a detailed partial side cross-sectional view of the gauging portion of the load cell of FIGURE 1;

FIGURE 3 is a top cross-sectional view of the load cell shown in FIGURE 1 taken along the line 3—3; and FIGURE 4 is a partial side cross-sectional view of the filling valve and cooperating safety valve shown in FIGURE 3 taken along line 4—4.

It has now been found that the several objects enumerated above can be accomplished by a novel load cell structure. This structure contains a clearance between two elements one of which is spring biased. The biasing means has insufficient force to jam any feeler gauge left in the clearance nor to cause damage to the cell housing by reason of such jamming. Filling is facilitated by the use of a quarter-turn filling valve having a ball nozzle for connection to the delivery pipe of a hydraulic fluid reservoir. More particularly, and as shown in FIGURE 1, the novel cell now proposed has a unique structure wherein the clearance between a gauging shoulder 34 on its fixed base and a spring biased stabilizing ring 36 of the piston is used to measure cell fill. The distance between the two is directly proportional to the fill of the cell. Immediately adjacent this coacting structure, within the wall of the cylinder is a gauging hole 38 for insertion of a feeler gauge (illustrated in dotted lines in FIGURE 1). If the feeler gauge inadvertently or intentionally is left in place, no damage to the gauge or to the housing will occur. At most, only the force of the spring biased element will be imposed upon the gauge, but this is insufficient to cause damage to the gauge or to the cell housing.

In addition, the structure as best seen in FIGURES 3 and 4 incorporates a quarter-turn filling valve 40 and a pressure relief safety valve 42 in the fill orifice 43. These two valves are so interconnected that overfilling or overpressuring of the load cell is impossible. The pressure relief valve will "pop" and prevent breakage or damage to the diaphragm of the cell if overpressuring during filling occurs.

Reference is now made to the drawing for a detailed disclosure of the apparatus. As shown therein, and as briefly mentioned above, the load cell, in essence, consists of a piston 12, a cylinder 14, a pressure chamber 16 beneath a diaphragm 18, pressure transmitting passageway 20 and indicator conduit 22 leading to an indicator (not shown).

As best seen in FIGURE 1, the cylinder 14 is formed by bolting an open-ended substantially tubular wall element 44 to a flat base 46 with bolts 48. The bolted arrangement also acts to clamp the diaphragm in place over pressure chamber 16.

The specific structural details of the tubular wall element are described hereinafter.

The base preferably has a circular indentation on its top surface to form the pressure chamber. Its outer rim configuration (see FIGURE 3) has a square shape to occupy less space and hence be more subject to easy attachment to existing structures.

Piston 12, within cylinder 14, includes loading head 30 and body 32.

The loading head preferably has a flat upper surface 50 with suitable bolt holes 52 to permit attachment to an object to be weighed.

Body 32 of the piston 12 rests on diaphragm 18 which encloses and seals the pressure chamber 16. The piston body 32 is supported against transverse movement within the cylinder cavity by an annular stay plate 24 and a bridge ring 26.

Stay plate 24 is fastened to the upper portion of the piston by a clamp consisting of an annular piston clamping ring 54 bolted to the piston body 32 by piston bolts 56. At its outer end, the stay plate 24 is similarly clamped to the cylinder wall 32 by an annular cylinder clamping ring 58 and a series of cylinder bolts 60.

As seen in FIGURES 1 and 2, bridge ring 26 fits within corner notches 62 and 64 in cylinder wall 44 and piston body 32 respectively. Annular wires 66 space the ring from the upper surfaces of the two notches and act as substantially frictionless pivots for the bridge ring during deflection. (Compare FIGURES 1 and 2).

It should be apparent that, in addition to supporting piston 12 against tranverse movement, the bridge ring 26 also reinforces the diaphragm 18 so that it will withstand the tremendous hydraulic forces usually generated in the pressure chamber.

Between the piston body 32 and the loading head 30 of the piston 12 is an ingenious "rolling ball" load centering coupling 28. The specific details of the coupling are thoroughly described in U.S. Patent No. 2,960,328 issued November 15, 1960.

Basically, the coupling consists of a hardened metal ball 68 interposed between two hardened metal inserts 70 and 72. Bolts 74 and 76 fasten the inserts 70 and 72 to the loading head 30 and the piston body 32 respectively. Ring 78 preferably of resilient material, such as neoprene rubber, positions the ball centrally within the cavity 80 of the piston body 32. It also acts as a shock absorber against lateral jarring forces.

If desired, the opposing surfaces of the metal inserts 70 and 72 may be made with a concave surface, such as shown at 82, to aid in centering of the ball.

It should be apparent that the coupling permits slight pivoting and some axial rotation of the loading head 30 about ball 68. The load is therefore still vertically transmitted to the piston body 32. Also there is no transmission of torque generated by the axial rotation to the piston body. It should also be evident that the coupling tends to partially absorb transverse forces because the ball will roll and take up some of the displacement.

A flexible boot 84, preferably of synthetic rubber or the like, suitably fastened to the cylinder wall 44 and to the loading head 30 by adjustable ring clamps 86 and 88 seal the interior of the cell from dirt, moisture, etc.

To enhance the vertical linearity of the piston, the cell also utilizes an arrangement which applies a small initial pressure to take up any slack in the system. This stabilizes the piston in a vertical direction. The arrangement consists of a series of biasing springs 90 forcibly spanned between an annular stop 92 and piston stabilizing ring 36. The latter is seated against annular shoulder 94 on the piston. The annular stop 92 is fastened to the top of the cylinder wall by bolts 96 positioned beneath the bolted stay plate 24.

Coacting with the spring biasing stabilizing ring 36 to form a novel gauging clearing is the gauging shoulder 34 on the inside surface of the tubular wall element 44. More particularly, the inside surface of the cylinder wall 44 is formed with a cornice-like annular structure at its lower portion. The projection shoulder 100 thereof acts to retain the piston within the cylinder body. The rail-like shoulder, on the upper surface of the cornice-like structure acts as the gauging shoulder 34. The height of gauging shoulder 34 is so formed that the distance or clearance between its top surface and the bottom surface of piston stabilizing ring 36 will approximate the fill of hydraulic fluid within the cell. Hereinafter, for convenience it will be termed the "gauging clearance" 37.

To permit insertion of a feeler gauge (illustrated by dotted lines in FIGURE 1) which can measure this gauging clearance, a gauging hole 38 has been formed in the wall of the cylinder, immediately adjacent the gauging shoulder 34. Thus, by the simple insertion of several appropriate fingers of the feeler gauge, the fill content of the cell can be easily determined.

As best seen in FIGURES 3 and 4, filling of the cell, is facilitated by the use of a quarter turn filling valve 40 within the load fill orifice 43. It will be obvious from the drawing that this passageway has been formed by drilling appropriately directed holes into the base and then plugging the outer one with plug 102 to form a closed fill orifice 43 subsequently in the base 46. The orifice is subsequently reamed and threaded to accommodate the inner portion of the quarter-turn filling valve 40. O-ring 104 and seal ring 105 seals the valve 40.

The exposed end of the filling valve has a ball orifice 110 to facilitate attachment thereto of the supply hose of hydraulic fluid.

To offset any possible overpressuring of the pressure chamber during filling the fill orifice also contains a pressure relief valve 42. It is spring actuated in response to a specified pressure. It then neutralizes any high pressures that may be generated during the filling operation.

Both the gauging hole and the filling valve are covered with a valve housing 106 having a hinge cover 108. The housing is bolted to the outside cylinder wall by bolt 140.

Study of the operating mechanism will reveal that the unique positioning of the gauging clearance completely eliminates any problems heretofore encountered by reason of jamming of the feeler gauge. Due to the unique structure, neither the gauge nor the housing of the cell which contacts the gauge will be subject to any pressure greater than the biasing force of spring 90. And consequently since this force is insufficient to cause scoring of the metal parts of the gauge or the cell housing or skewing of the aligned parts of the cell, no damage to the gauge or to the housing can occur.

With respect to filling the cell, this is now accomplished by simple attachment of a snap connector to the ball nozzle 110 of the filling valve. And with a quarter turn of the valve, the pressure chamber cavity is opened so that the cell may be filled or bled in a clean fast operation. If, by accident, the pressure of the supply line is too great, pressure relief valve 42 will open to avoid damage to the diaphragm 18 or to other parts of the cell.

Thus, a novel structure has been provided which facilitates loading of the cell without concern by the manufacturer or user for careless or accidental damage during servicing of the cell. Obviously a great advantage has thereby been effected.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A hydraulic weighing cell, comprising, in combination, a base having means forming a pressure chamber therein, a diaphragm overlying said pressure chamber, a piston overlying said diaphragm, a cylinder surrounding said piston, piston stabilizing means spacing said piston from said said cylinder, a first annular shoulder around said piston, a downwardly biased ring on said shoulder, means forming a gauging hole in said cylinder adjacent said ring, said gauging hole terminating at a flat gauging surface inside said cylinder, a second annular shoulder around said piston, and an annular projection around the interior of said cylinder and overlying said second annular shoulder on said piston, whereby upward travel of said piston is limited by engagement of said second annular piston shoulder and said annular projection and fluid volume in said pressure chamber may be measured through said gauging hole between said ring and said gauging surface.

2. A hydraulic weighing cell as defined in claim 1 wherein said base is provided with means forming a first passage from said pressure chamber through said base to a point outside said base, a rotatable filling valve in said first passage having an exterior fluid connection, means forming a second passage through said base from said filling valve to a point outside said base, a pressure relief valve in said second passage, said relief valve closing said passage until a predetermined pressure is exceeded, said filling valve providing fluid communication from said pressure chamber to said relief valve and to said exterior connection when in a first position and closing off said pressure chamber from said relief valve and said exterior connection when rotated to a second position.

3. In a hydraulic weighing cell having a base with means forming a pressure chamber therein, the combination of a means forming a first fluid passage from said pressure chamber through said base, means forming a second fluid passage through said base and intersecting said first passage, a two-position filling valve at the intersection of said passages, and a safety relief valve in said second passage, whereby said filling valve provides fluid communication through said first passage and through said second passage to said relief valve when in a first position and closes off both of said passages when in a second position.

References Cited in the file of this patent

UNITED STATES PATENTS 2,960,328    Tate _____ Nov. 15, 1960